Figure 1:
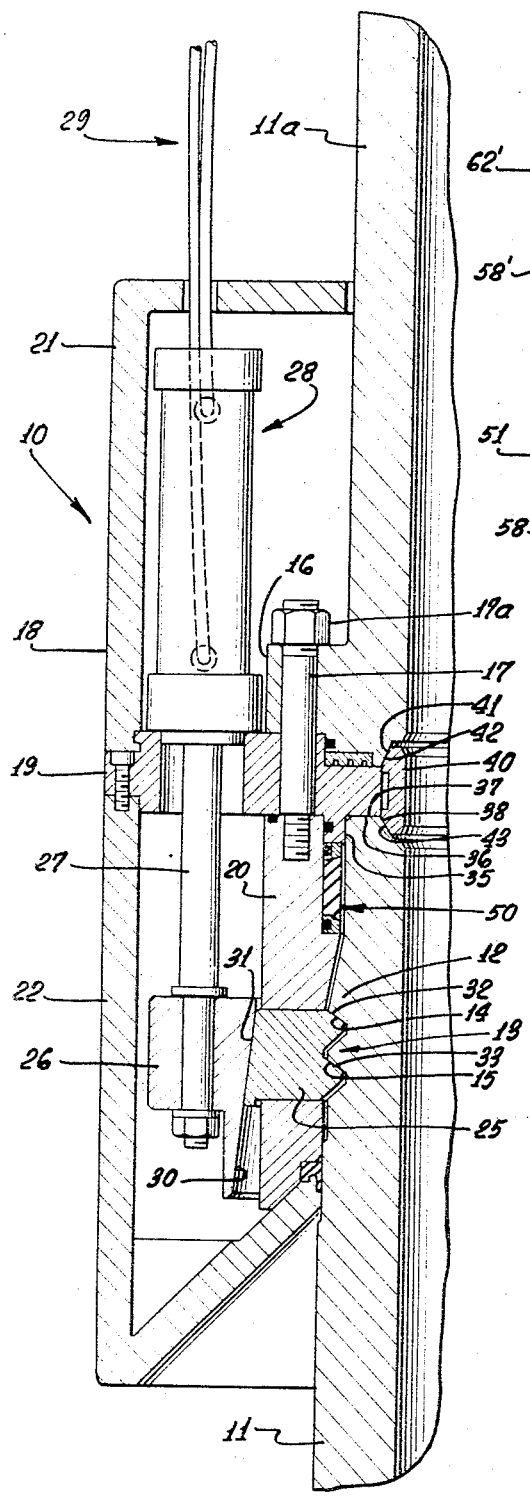

Aug. 1, 1967  B. J. WATKINS  3,333,870
MARINE CONDUCTOR COUPLING WITH DOUBLE SEAL CONSTRUCTION
Filed Dec. 30, 1965

INVENTOR.
BRUCE J. WATKINS
By Miketta, Glenny, Poms & Smith
ATTORNEYS.

3,333,870
MARINE CONDUCTOR COUPLING WITH DOUBLE SEAL CONSTRUCTION
Bruce J. Watkins, Palos Verdes Estates, Calif., assignor to Regan Forge & Engineering Co., San Pedro, Calif., a corporation of California
Filed Dec. 30, 1965, Ser. No. 517,573
10 Claims. (Cl. 285—18)

This application is a continuation-in-part of my co-pending applications, Ser. No. 300,277 filed Aug. 6, 1963, and now abandoned, entitled, "Marine Conductor Coupling," and Ser. No. 458,813 filed May 10, 1965, and now abandoned, entitled, "Marine Conductor Coupling."

This invention relates in general to oil well drilling and production operations and marine conductor pipe couplings employed therein to join successive sections of sub-sea well pipe, conductors or conduits together in tight fluid sealed connections. More particularly, this invention relates to such marine conductor couplings wherein both primary and secondary sealing means are provided to effect a double seal between such joined conductors, conduits or pipes wherein each of the seal means is independently actuated and tested.

Marine conductor couplings are disclosed in my above-identified co-pending applications, Ser. Nos. 300,277 and 458,813 which are particularly well suited for use in sub-sea oil well drilling where marine conductors and control tubes, as disclosed in my co-pending application, Ser. No. 326,917 filed Nov. 29, 1963, are employed. The use of conductor pipes or conduits running from an oil well rig down to a sub-sea well or well formation is common in sub-sea oil well drilling and producing operations for the transmission of fluids to or from the well through a sea water environment. It is essential that such marine conductor couplings effect highly reliable fluid seals between the joined conductors, pipes or conduits.

In my previous marine conductor couplings, a single seal means has been used between the joined conduits or pipes to retain high pressure well fluids within the conduits and the surounding sea water under high hydrostatic pressure outside of the conduits. Some users of such oil well drilling equipment prefer metal seals between the connected conduits or between one of the conduits and the coupling because of the longer operating life of such metal seals. However, it is possible to damage such metal seals after repeated use prior to the end of their expected life causing their reliability to be questioned by some oil well tool users and oil well drilling contractors. Prior attempts to provide a second seal between the coupling and conduits have not been satisfactory in that the conduits frequently are not in fact joined and only one of the seals is actually effected. This has occurred because of the trapping of incompressible fluids between the seals which prevents the complete landing or connecting of the conduits together. Also, no simple means for testing the effectiveness of such seals has heretofore been devised.

It is the principal object of this invention therefor to disclose and provide a marine conductor coupling and a method of effecting such a coupling wherein highly reliable and effective primary and secondary seals are provided but which are not effective to prevent the complete landing or joining of the conduits together.

It is another object of the present invention to disclose and provide the marine conductor coupling and method of the foregoing object in which the effectiveness of the primary and secondary seals may be tested independently of each other.

It is a further object of this invention to disclose and provide a highly reliable marine conductor coupling and method of attaining the same wherein the joined conduit is very tightly wedged against a primary seal means positioned within the coupling body to abut the end face of such joined conduit, the primary seal can then be tested for its sealing effectiveness while a secondary seal remains unactive and wherein the secondary seal means may be thereafter actuated to provide a secondary seal between said joined conduit and the coupling or other conduit independently of said primary seal.

It is another object of this invention to disclose and provide the marine conductor coupling and method of the foregoing object wherein the secondary seal may be tested independently of the primary seal already effected between the coupling and joined conduit to determine the effectiveness of the secondary seal.

It is a still further object of this invention to disclose and provide a marine conductor coupling and method of any of the foregoing objects wherein the primary seal means is a metal seal and the secondary seal includes an elastic rubber-like seal element independently energized to seal about the joined conduit.

Generally stated, the marine conductor coupling according to the present invention, comprises a first part, termed herein an annular gib means, to be mounted to a first conduit and a second part, termed herein an annular socket or receiver means of the coupling, to be mounted to an end of a second conduit. The first part, or gib means, is adapted to be tightly fitted into the annular socket means by operation of manually or hydraulically actuated latching means. The latching means for the exemplary embodiment associated with the coupling socket means includes a plurality of dog members adapted to engage and wedge the gib means into the coupling with an end wall of the gib means tightly abutting a first seal means disposed within the coupling socket portion. This first seal means is preferably a metal seal which is self-energized, to effect a seal against the end of the gib means, due to the wedging action of the gib means against it.

A secondary elastic seal means is provided within the coupling socket axially spaced therein from the first seal means. After landing and tightly wedging the coupling socket onto the gib means and the testing of the effectiveness of the primary seal, the secondary seal means is independently actuated to provide a secondary seal about the gib means and within the coupling socket.

Means are provided for introducing fluid pressure into the small annular space between the gib means and surrounding coupling socket on a side of the elastic secondary seal means facing the primary seal means. By introducing hydraulic pressure between the two seal means, the effectiveness of the second seal can be determined.

Figure 2:
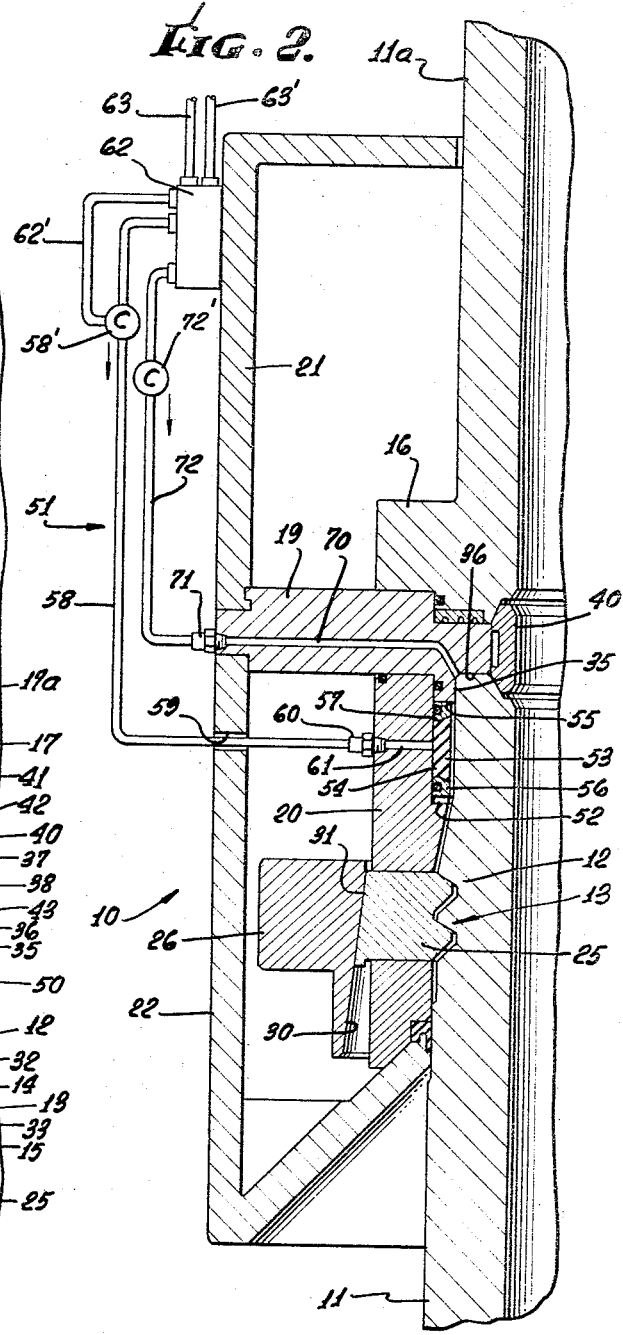

Other objects as well as various advantages of the marine conductor coupling, in accordance with the present invention, will become apparent to those skilled in the art from a consideration of the following detailed description of an exemplary embodiment thereof. Reference will be made to the appended sheet of drawings in which:

FIG. 1 is a section view of the exemplary embodiment of marine conductor coupling; and FIG. 2 is another section view of the exemplary embodiment of marine conductor coupling of FIG. 1.

Those unskilled in the art are referred to my co-pending application Ser. No. 458,813, filed May 10, 1965, for its explanation, with particular reference to FIG. 1 therein, of a conventional sub-sea oil well installation and the use therein of marine conductor couplings to couple conduits. The term conduit as used herein refers to any casing, pipe or string used in well drilling or production operations.

Referring first to FIG. 1, an exemplary embodiment of a marine conductor coupling according to the present invention is indicated generally at 10. The coupling is shown tightly joining a first conduit 11 to a second conduit or pipe 11a. The first conduit 11 is preferably provided with a gib means or portion 12 including a circumferential notch means, indicated generally at 13.

The exemplary embodiment of notch means includes two spaced circumferential notches having convergently inclined side walls. Inclined notch side walls 14 and 15, facing away from the free end of conduit 11, are adapted to be abutted by dog means, as hereinafter described, to facilitate the tight wedging of the first conduit 11 into the coupling socket.

The conduit 11 and its gib portion 12 are tubular to allow passage of hydraulic fluid, cement, gas, oil or any other fluids under high well pressures therein as may be required during conventional oil well drilling and production operations. The gib means 12 may be considered as being one part of the coupling to be effected between conduits 11 and 11a.

The second part of the coupling, the coupling body or socket portion, is mounted on the end of the second conduit 11a in the exemplary embodiment by the provision of a conduit flange 16. The coupling body or socket is mounted to the second conduit flange 16 by means of conventional studs 17 and bolts 17a as shown in FIG. 1.

Coupling body or socket means 18 in the exemplary embodiment includes a central ring portion 19, a lower body or socket portion 20 and a surrounding housing comprising upper and lower housing members 21 and 22. The studs 17 pass through the center ring 19 and are screwed into the lower body or socket portion 20 to hold the body portion 20 and ring 19 to the second conduit flange 16. The surrounding housing members 21 and 22 can be fastened to ring 19 and lower body or socket portion 20 by conventional means such as welding or mechanical fasteners.

Latching means are employed in the exemplary embodiment to tightly wedge the first conduit 11 into the coupling socket provided by the lower body or socket portion 20 and the center ring portion 19. The latching means includes a plurality of latch elements or dogs 25, a force transmitting dog or ring 26 and a plurality of manually or hydraulically operated latching pins or rods 27 connected to the dog or ring 26. In the exemplary embodiment, the rods 27 are hydraulically operated by conventional hydraulic piston means indicated generally at 28.

Hydraulic pressure fluid lines, indicated generally at 29, may be connected between the hydraulic cylinders and the drilling rig or vessel from which the drilling or production operations are being conducted. These hydraulic lines are connected to the hydraulic cylinder in a manner allowing the pressuring of the cylinder therein on either side so as to cause powered raising or lowering of the rods 27, and connected force transmitting dog 26, as desired from the floating vessel. While the force transmitting dog or ring 26 is preferably provided in a ring configuration as shown, it may be provided in individual segments each connected to a rod 27.

The application of hydraulic fluid pressure within the hydraulic cylinders, as indicated generally at 28, above the piston heads contained therein causes downward movement of ring 26 and an inward wedging of each dog 25. Ring 26 has an inclined wedging surface 30 adapted to mate and wedge against a similarly inclined surface 31 on each dog 25. Each dog 25 is mounted to the lower body or socket portion 20 to slide transversely therethrough to engage the circumferential notch, indicated generally at 13, of the gib means 12. Upon inward wedging of each dog 25, the dog in turn wedges its upper inclined surfaces 32 and 33 against the gib inclined surfaces 14 and 15 to tightly wedge the first conduit 11 into the coupling body or socket.

The coupling body or socket is provided with an inner socket side wall 35 and an inner socket end wall or seat 36. The free end of the first conduit gib portion 12 is provided with a free end face or gib end seat 37 and an inner annular upwardly facing seal engaging surface 38.

Primary seal means are provided between the first and second conduits 11 and 11a, respectively. The primary seal means in the exemplary embodiment comprises an annular metal seal 40 disposed within the coupling body or socket portion, adjacent the center ring 19, to be abutted by end portions of the conduits 11 and 11a. Metal seal means 40 may be press-fitted into the central portion of the coupling body or socket means with one sealing surface 41 abutting an end surface 42 of the second conduit 12. Upon the tight wedging of the first conduit end face or seat 36 against the socket inner end wall or seat 37 by the latching means, a primary seal is automatically effected between the upwardly facing end face or seat 38 of the first conduit and a lower or second sealing surface 43 of the metal seal means. The metal seal 40 is self-energized because of its inherent resiliency upon being forceably abutted by the first conduit gib end seat 38 to provide a primary seal between the first conduit 11 and the second conduit 11a.

If a conventional O-ring or self-energized seal means were provided within the coupling socket body 20, hydraulic fluid or sea water could be trapped between such seal, socket body 20, center portion 19, seal 40 and the free end of the first conduit gib portion 12 upon landing of the coupling body upon the gib means. Such trapping of incompressible fluids within the coupling has prevented the seating of the free end face or seat 37 of the gib portion 12 against the socket inner end wall or seat 36 to provide a desired tightly joined coupling of the conduits 11 and 12.

In accordance with the present invention, a secondary seal means is provided within the coupling socket or body to provide a secondary seal which is initially ineffective upon landing of the coupling body upon the gib means 12 but is thereafter independently actuated to provide a reliable secondary seal. In the exemplary embodiment, such secondary seal means includes the elastic seal means, indicated generally at 50 and independently operable hydraulic fluid pressure means, indicated generally at 51, for operating said elastic seal means.

Referring to FIG. 2, in the exemplary embodiment the lower body or socket portion 20 is provided with a cutout notch 52 into which an annular elastic seal means 53 is placed. Seal means 53 may be constructed in accordance with the disclosure of the elastic seal construction disclosed in United States Patent No. 2,945,665. Seal 53 includes a rubber-like expandable center member 54 with metal ring ends 55 and 56, respectively. The upper metal ring 55 abuts a lower end wall 57 of the body or socket center ring 19. The notch 52 in the exemplary embodiment is longer than the seal means 53 so that the lower seal ring 56 may slide upwardly and downwardly therein.

Upon the initial landing of the second conduit 11a and the coupling socket or body, including the lower body portion 20 and center ring portion 19, upon the first conduit 11, no seal is effected between the secondary seal means, indicated generally at 50, and the outer walls of the first conduit 11. The latch means are then actuated manually, or hydraulically as in the exemplary embodiment, to tightly wedge the end face 37 of the first conduit gib means against the inner socket seat 36 in the absence of any trapped hydraulic fluid or sea water which would prevent the tight engagement between the inner seat of the coupling socket and the first conduit gib. Consequently, the desired and expected tight primary seal is effected between the gib end sealing surface 38 and the metal seal lower sealing surface 43. This primary seal may then be tested for its effectiveness by the application of high fluid pressures within the first and second conduits 11 and 12. If no fluid is lost through the coupling, the effectiveness of the primary seal is assured.

After the testing of the primary seal as above explained, the secondary seal, indicated generally at 50, may be independently actuated by means operable from the rig, vessel or ship from which the drilling or production operations are being conducted. In the exemplary embodiment, such independently operable means include the hydraulic fluid supply means indicated generally at 51. Such hydraulic fluid supply means may include the fluid line 58 which passes through a check valve 58', the port 59 in the lower housing 22 and connects to the fitting 60 screwed into the lower body or socket 20 of the coupling. A fluid passage 61 provided through the body or socket portion 20 connects the fitting 60 and hydraulic line 58 to the inner side of the elastic member 54 of the second seal means.

Upon the application of hydraulic pressure fluid to the inner surface of the elastic member 54 through the conduit 58, fitting 60 and passageway 61, the secondary seal means element 54 expands inwardly against the side walls of the free end or gib portion of the first conduit 11 to effect the secondary seal between the coupling body or socket and the first conduit. A pilot valve means 62 may be provided for selectably supplying pressured hydraulic fluid to lines 58, 72 and 62' from hydraulic fluid lines 63 and 63' running to the vessel or ship. Check valve 58' maintains the desired seating pressure on element 54.

Means for independently testing the secondary seal effected between the conduit body or socket means and the first coupling are provided in order to determine the effectiveness of such secondary seal apart from the operability of the aforedescribed primary seal. In the exemplary embodiment, such secondary seal testing means includes a hydraulic fluid passageway 70, provided through the socket body central portion 19, communicating between a fitting 71 on the exterior of the coupling body and the interior of the coupling socket portion at the socket inner wall 35 and adjacent the free end of the first conduit gib means. A second hydraulic fluid line 72 interconnects the fitting 71 through a check valve 72' with pilot valve 62 to allow selective introduction of high pressure hydraulic fluid from line 63 into the small annular space between the coupling body or socket inner wall 35, secondary seal means indicated generally at 50, the gib end side walls and end face of gib means 12, seal 40 and the lower face 36 of ring portion 19.

The secondary seal means may be thus pressured through the pilot operated check valve 58' in line 58 and tested by pressuring line 70 through check valve 72'. A pilot line 62' is provided for opening the check valve 58' to release the pressure energizing the seal element 54. Release of seal element 54 will relieve the fluid pressure in line 72.

The method of effecting a double seal coupling between the two axially aligned sub-sea well conduits from a remote floating vessel has been disclosed in the foregoing detailed explanation of an exemplary embodiment of the marine conductor coupling construction of the present invention. In summary, the coupling body, including central portion 19, lower portion 20 and the surrounding housing 21 and 22, is assembled to the lower end of the sub-sea well conduit to be lowered from the drilling rig toward the sub-sea well.

The primary seal means 40 may then or previously be assembled within the socket portion adjacent the inner end wall 36 of the socket. The secondary seal means, indicated generally at 50, may then be assembled or be pre-assembled to the coupling body socket about the inner side wall of member 20 adjacent the inner side wall 35. Upon the landing of the coupling body upon the free end 12 of the other conduit beneath the sea, the end face seats 37 and 38 are placed adjacent to the socket end wall 36 and the primary seal 40. The weight of the conduits above the coupling body may cause seats 37 and 38 to temporarily abut the socket end wall 36 and primary seal member 40, but lateral movement of the conduit 12 due to sea currents tends to cause separation thereof.

The lower conduit 11 and the coupling body are then tightly wedged together by the latch means, including dog 25, force transmitting dog 26 and the hydraulic pressure means including cylinder 28 and hydraulic lines 29 leading to the floating vessel. Such tight wedging of the lower conduit and coupling together forces the seat 37 against the socket end wall 36 to provide a tight coupling and forces the sealing seat 38 against the metal seal 40 to provide a tight primary seal therebetween. At this stage in the method, the secondary seal means, including the seal member 53, is inoperative to provide a secondary seal. The primary seal can then be tested by the introduction of fluid under high pressure within the conduits 11 and 11a.

Thereafter, the secondary seal means is activated independently of the primary seal means to provide an independent secondary seal between the lower conduit and the coupling body. This step of the method can be accomplished by the operation of hydraulic pressure means from a source on board the floating vessel through the hydraulic lines 63, valve 62, line 58 and passageway 61 to render the seal means 53 operative. This secondary seal, according to the present method, can then be tested by the introduction of hydraulic fluid pressure through the lines 63, valve 62, line 72 and passageway 70 to the small annular space surrounding the free end of conduit 11 inside the inner socket wall 35. Such introduction of fluid under high pressure inwardly of the secondary seal means between the coupling socket and free end of the conduit 11 allows the testing of the effectiveness of this secondary seal independently of the primary seal.

It may be seen from the foregoing that the method and exemplary construction for providing independently operable primary and secondary seals in a marine conductor coupling, in accordance with the present invention, satisfy the foregoing objects. The marine conductor coupling provided has highly reliable and effective primary and secondary seals which do not prevent the complete landing or joining of the conduits together. The effectiveness of each seal may be tested independently of the other. A very tight coupling of the conduits is accomplished by the wedging of the free end of one conduit against an inner end wall of the socket and a self-energized metal seal within the socket. By the provision of such primary metal seal, the longer life of a metal seal is attained by the coupling. However, the additional reliability of an elastic rubber-like secondary seal is also attained through the provision of the secondary seal means as herein disclosed.

Having thus described a preferred exemplary embodiment of the marine conductor coupling with a double seal construction together with the method for obtaining such primary and secondary seals between coupled conduits, according to the present invention, it should be noted that other embodiments, modifications and adaptations thereof may be made which come within the scope of the present invention which is defined by the following claims.

I claim:

1. The method of providing a double sealed coupling between two axially aligned sub-sea well conduits comprising the steps of:

assembling a coupling body to an end of a conduit to be lowered from a floating vessel toward a second conduit in the sea below the vessel;

assembling a primary seal means within a socket portion of said coupling body adjacent an inner end wall of said socket portion and a secondary seal means within said socket portion about an inner side wall thereof and axially spaced outwardly from said primary seal means;

landing said coupling body upon a free end of the second conduit and coupling said body to said free end with an end face seat of said free end abutting said primary seal means to effect a primary seal without effecting a seal between said secondary seal means and said second conduit; and thereafter activating said secondary seal means to provide a secondary seal between said coupling body and said second conduit independently of said primary seal.

2. The method of claim 1 with the additional step of:
wedging said second conduit free end into said coupling body during said step of landing and coupling to tightly wedge a second end face seat of said free end against a socket inner end wall while effecting said primary seal.

3. The method of claim 1 with the additional step of introducing fluid under high pressure into the conduits after said landing and coupling step and prior to the last step of activating said secondary seal means to test the effectiveness of said primary seal.

4. The method of claim 1 with the additional step of introducing fluid under high pressure between said coupling body and said second conduit free end in the socket portion inwardly of the secondary seal means after the step of activating said secondary seal means to test the effectiveness of the secondary seal.

5. The method of claim 1 with the additional steps of providing fluid pressure means between said vessel and coupling body and operating said pressure means at said vessel to selectively actuate latch means for said coupling, activate said secondary seal means for said activating and introduce fluid under pressure between said coupling body and second conduit free end inwardly of said secondary seal means in said socket portion to test said secondary seal.

6. A sub-sea well conduit connection apparatus comprising:
a coupling body including latch means on the end of a first sub-sea well conduit including a central bore;
gib means on the end of a second sub-sea well conduit to be received within said coupling body and engaged by said latch means, said gib means having an end face seat;
primary seal means within said coupling body against which said gib means end face seat seals upon landing and latching of said gib means within said coupling body to provide a primary seal therebetween;
secondary seal means within said coupling body and axially spaced therein from said primary seal means, said secondary seal means being ineffective to provide a seal between said coupling body and gib means upon said landing and latching; and
independently operable means for activating said secondary seal means after landing and latching said gib means within said coupling body for selectively and independently providing a secondary seal between said coupling body and gib means.

7. The sub-sea well connection apparatus of claim 6 wherein said primary seal means comprises a self-energized metal seal and said secondary seal means includes a non-metal elastic seal element.

8. The sub-sea well connection apparatus of claim 7 wherein said independently operable means includes hydraulically operated means for selectively expanding said elastic seal element against said gib means.

9. A sub-sea well conduit coupling apparatus to provide independently operable primary and secondary seals between the joined conduits comprising:
a coupling body to be mounted on an end of a conduit to be lowered from a floating vessel toward a second conduit in the sea below the vessel, said body including a socket portion to receive a free end of the second conduit and a latching means for latching said coupling body to the second conduit free end;
a first seal means within said body to seal upon said second conduit free end upon the latching of second conduit free end into said coupling body socket portion;
a second seal means within said body inoperable to seal upon said second conduit upon reception of said second conduit free end into said socket and upon said latching; and
means for activating said second seal means after said body is latched to said second conduit to provide a secondary seal between said body and second conduit independently of said primary seal.

10. The sub-sea well conduit coupling apparatus of claim 9 wherein means are provided for introducing fluid under pressure between said coupling body and said conduit free end in said coupling body inwardly of said secondary seal means for testing said secondary seal independently of said primary seal means.

References Cited
UNITED STATES PATENTS

| | | | |
|---|---|---|---|
| 2,504,025 | 4/1950 | Humason | 285—97 |
| 2,648,554 | 8/1953 | Gilbert | 277—58 X |
| 2,868,297 | 1/1959 | Lamberson. | |
| 2,962,096 | 11/1960 | Knox | 285—18 X |
| 3,078,110 | 2/1963 | Starr. | |
| 3,155,401 | 11/1964 | Musolf | 285—18 |
| 3,220,245 | 11/1965 | Van Winkle | 73—46 |
| 3,239,248 | 3/1966 | Jones. | |

CARL W. TOMLIN, *Primary Examiner.*

R. G. BERKLEY, *Assistant Examiner.*